United States Patent Office 3,565,654
Patented Feb. 23, 1971

3,565,654
PROCESS FOR TREATING POLYAMIDE-BASED RESIN PARTICLES FOR USE IN ELECTROPHOTOGRAPHY
Augustus L. Story, Toledo, Ohio, assignor to Owens-Illinois, Inc., a corporation of Ohio
No Drawing. Filed Aug. 29, 1966, Ser. No. 575,571
Int. Cl. C08h 9/00
U.S. Cl. 106—243     10 Claims

ABSTRACT OF THE DISCLOSURE

There is disclosed the preparation of an electro-photographic decorating composition comprising highly electrically resistant decorative powder particles consisting of an organic polyamide resin-based composition treated with alkali silico aluminate in an amount sufficient to increase the electrical conductivity thereof.

---

This invention relates to a novel composition and process for the practice of electrophotographic decorating, especially electrostatic printing. More particularly, this invention relates to a novel organic coating composition having a semi-electroconductive surface and a process for preparing and/or using same.

Electrophotographic decorating including electrostatic printing is used for the decorating and printing of many surfaces, such as glass, ceramics, textiles, plastics, paper and paper-board-type products, and other articles of commerce.

The electrostatic printing process, as generally employed for printing and decorating, comprises moving a decorative coating composition consisting of powder particles through the image-defining apertures of a screen or stencil to a printable or decorable surface. In addition, other printing techniques may be used such as off-set printing, wherein the image-forming powder is first transferred through an image screen to another surface, then off-set from this surface to the printable or decorable surface.

In the practice of such electrostatic printing processes, various problems are typically encountered from the use of the decorative or image forming powder particles. For example, if a powder particle is inherently non-electroconductive, it will not readily move in an electrostatic field. Likewise, if the resistivity of a powder particle is very high, it may require precharging by corona techniques or by triboelectric means, in which event, the polarity of the electrical field must be oriented in accordance with the polarity of the charge on the particle. Furthermore, if a group of powder particles are given a triboelectric charge, the particles so charged tend to agglomerate at the printing screen apertures resulting in a blocking of same. Moreover, the charged particles tend to adhere electrostatically when in immediate contact with other particles or surfaces.

Attempts have been made to render inherently non-electroconductive powder particles conductive. For example, various fillers have been added to the decorative powder particles to make them semiconductive. Typical of the fillers employed for this purpose are carbon black, silver and gold, all of which seriously limit the possible color range and shades of colors which can be obtained.

In accordance with the practice of this invention, inherently non-electroconductive decorative powder particles are treated and modified so as to make the particles electroconductive and suitable for electrophotographic decorating or printing.

More particularly, highly electrically resistant decorative powder particles consisting of an organic resin-based coating composition are treated with at least one alkali silico aluminate in an amount sufficient to increase the electrical conductivity thereof. In the preferred practice of this invention, the alkali silico aluminate is sodium silico aluminate.

In a further embodiment of this invention the alkali silico aluminate is treated with an anti-static agent prior to or in conjunction with the treatment of the powder particles.

In the practice of this invention it has been discovered that best results are obtained by the treatment of powder particles consisting essentially of polyamide-based resin compositions; for example, it has surprisingly been discovered that the use of sodium silico aluminate as a treating agent has no deleterious effect on the film properties of polyamide coating or ink compositions relative to the use of other treating agents and/or fillers such as carbon black and metallic powders. It has further been discovered that the sodium silico aluminate treatment improves the flow-ability and deagglomeration characteristics of solid, dispersed polyamide powder particles.

It is contemplated using any available polyamide resin in the practice of this invention. Polyamide type resins are generally thought of as condensation products which contain recurring amide groups. Such resins may be formed by means well known in the art, for example by the condensation of diamines with diacids.

Examples of polyamides contemplated in the practice of this invention include not by way of limitation the condensation products of ethylenediamine and sebacic acid, propylenediamine and sebacic acid, tetramethylenediamine and adipic acid, tetramethylenediamine and suberic acid, pentamethylenediamine and malonic acid, pentamethylenediamine and octadecanedioic acid, hexamethylenediamine and adipic acid, octamethylenediamine and sebacic acid, decamethylenediamine and oxalic acid and the like.

Commercially available polyamide resins suitable in the practice of this invention include not by way of limitation polyamide resin Scope 30, which is the resinous derivative of diphenolic acid characterized by a softening temperature of 98° C. to 102° C., and acid value of 3.75 maximum, an amine value of 8.50 maximum, and a specific gravity of 0.99; the thermoplastic resins known commercially as Versalon, for example Versalon 1112 as characterized by a softening temperature of 105° C. to 115° C., a tensile strength of 1900 to 2100 pounds per square inch at 75° F., and a specific gravity of 0.955; and the commercially available polyamide resins known as Polymid 1144 characterized by an acid value of 3.4, an amine value of 4.8, a melting temperature of 99° C. to 104° C., and a specific gravity of 0.99; the polyamide resin Polymid 1155 with an acid value of 5, an amine number of 5, and a specific gravity of 0.98; the polyamide resin Polymid 1060 with an acid value of 4.0, an amine value of 1 to 2, a melting temperature of 112° C. to 113° C., and a specific gravity of 0.97; and the polyamide resin known commercially as Polymid 1074, characterized by an acid value of less than 6, an amine value of less than 6, a melting temperature of 102° to 108° C., and a specific gravity of 0.98. Also, other polyamide thermoplastic resins may be used such as Versamid 900 with an amine value of 4, a specific gravity of 0.98, and a softening temperature of 180 to 190° C., and Versamid 950 with an amine value of 4, a specific gravity of 0.98, and a softening temperature of 90 to 100° C.

Scope is a registered trademark for resinous derivatives of diphenolic acid available from S. C. Johnson and Son, Inc., Racine, Wis. Technical bulletins are available which contain additional technical information including physical and chemical properties of the Scope resins and general procedures for preparation. Such bulletins include Technical Bulletins CD–20, Revision 2, issued June 1964, and CD–43, issued April 1963 by the Chemical Division of S. C. Johnson and Son, Inc.

Versalon is a registered trademark for polyamide resins available from General Mills, Inc., Chemical Division, Kankakee, Ill. Technical bulletins published by such company include CDS 4–63 and CDS 5–63, each having an effective date of Nov. 1, 1963, and such being revised on Feb. 1, 1965.

Versamid is a registered trademark for polyamide resins also available from General Mills, Inc., Kankakee, Ill. Technical bulletins published by such company include Versamid specification sheet 11, June 1, 1962.

For additional technical information on the General Mills polyamide resins, reference is made to U.S. Letters Patent 3,224,893, which is incorporated herein by reference.

Generally, the polyamide resins used herein will have an acid value of about 3 to 5, an amine value of about 1 to 8.5, and a specific gravity of about 0.92 to 0.99.

The polyamide based particles to be treated in accordance with this invention are generally prepared by intimately mixing the selected polyamide resin(s) with at least one inorganic and/or organic pigment(s).

The inorganic and organic pigments contemplated in the practice of this invention may be white or colored.

Typical inorganic pigments include (not by way of limitation) barium sulfate, white lead, calcium carbonate, chrome green, iron blues, lithopones, and oxides of metals or metalloids such as titanium, silicon, aluminum, lead, zirconium and chromium.

When the selected pigment is a metal oxide, it is especially desirable if it is prepared by a vapor phase decomposition technique such as the vapor phase decomposition of a titanium halide in the presence of an oxidizing or hydrolyzing agent to produce titanium oxide, e.g. $TiO_2$. Rutile $TiO_2$ as distinguished from anatase is particularly suitable.

Organic pigments contemplated herein may be chemically classified as nitro, azo, diazo, nitroso, isonitroso, oxyketone, ketonimides, hydrazides, triphenylamines, azines, quinolines, acridine, indanthrene, and phthalocyanine colors. Examples of pigments include not by way of limitation anthosine, benzidine yellow, eosine, rose bengal, Hansa yellow, lithol red, methyl red, and peacock blue.

The selected resin(s) and pigment(s) may be suitably mixed by stirring, blending, and/or melting together, and hot milling at a suitable temperature. The milled composition is cooled, usually to room temperature, and the resulting cooled mass is dry ground or pulverized to subsieve sizes, usually about 2 to 20 microns.

The polyamide-based powder particles may also be prepared by blending a selected polyamide resin(s) and pigment(s) on a hot mill and cooling the blend to a solidified, hardened mass. The mass is then mixed with an appropriate solvent compatible with the resin and the resulting mixture spray-dried to form finely-divided discrete powder particles.

In the practice of this invention the polyamide-based particles are treated with alkali silico aluminate (such as sodium silico aluminate) in an amount sufficient to provide a resulting effective resistivity of about $10^{11}$ to $10^5$ ohms per centimeter per square centimeter (ohms-centimeter) for the recovered dry particles. Dry polyamide-based particles not treated in accordance with this invention typically have a resistivity in excess of about $10^{12}$ ohms-centimeter, usually about $10^{12}$ to $10^{15}$.

Suitably the polyamide-based resin particles are treated with about 0.1 to 10 percent by weight of the alkali silico aluminate based on the total weight of the dry particles. A good working range is about 0.5 to 5.0 with a preferred range of about 1 to 3 percent by weight.

The particles may be treated with the alkali silico aluminate in any suitable manner.

In one particular embodiment hereof it is contemplated aqueously slurrying the particles in the presence of the alkali silico aluminate, evaporating the water from the slurry, and recovering the dry treated particles.

In other embodiments of this invention it is contemplated dry treating the particles by convenient dry blending procedures.

The alkali silico aluminate treating agent contemplated herein is at least one member selected from sodium silico aluminate, potassium silico aluminate, lithium silico aluminate, rubidium silico aluminate, and cesium silico aluminate.

As noted hereinbefore, the preferred and most readily available alkali silico aluminate is sodium silico aluminate. It is commercially available from the J. M. Huber Corporation, New York, N.Y. as Zeolex 7. Zeolex is a registered trademark.

Zeolex 7 is a hydrated sodium silico aluminate of ultra-fine particle size having a mean particle diameter of 22 millimicrons, a 325 mesh screen maximum residue of 0.1 percent by weight, a bulk density of 3 pounds per cubic foot (aerated), and 18 to 20 pounds per cubic foot (packed), and a true specific gravity of 2.1. It has a bright white color, a percent reflectance of 91 to 93, refractive index of 1.51, a pH of 7.0, an oil absorption of 135 grams per 100 grams, and a surface area of 130 square meters per gram (using the well known B.E.T. procedure with nitrogen gas).

A chemical analysis of a typical sample of Zeolex 7 indicates about 66 to 71.5 percent by weight $SiO_2$, about 11 to 13 percent by weight $Al_2O_3$, about 5 to 7 percent by weight $Na_2O$, about 0.73 percent by weight $CaO$, about 1.5 (max.) percent by weight sodium sulfate, about 0.4 to 0.5 percent by weight $TiO_2$, 0.2 percent by weight $Fe_2O_3$, a very faint trace of Mn and Cu, and ignition losses (at 900° C.) of 11 to 13 percent by weight.

Sodium silico aluminate is usually prepared by reacting sodium silicate with alum under appropriate conditions known in the art so as to precipitate amorphous discrete particles of sodium silico aluminate. By selecting the appropriate alkali silicate, the other alkali silico aluminates may be suitably prepared. Likewise, such aluminates may be prepared by substitution of one alkali metal for another in a previously prepared alkali silico aluminate.

As also noted hereinbefore, it has further been discovered that the results of this invention are significantly enhanced if the alkali silico aluminate is treated with an anti-static agent prior to or in conjunction with the treatment of the ink particles.

In accordance with this invention it has been discovered that best results are obtained when the anti-static agent is a quaternary ammonium salt. Examples of suitable commercially available quaternary ammonium salts are stearamidopropyldimethyl - beta-hydroxyethylammonium dihydrogen phosphate and stearamidopropyldimethyl-beta-hydroxyethyl ammonium nitrate, and polyethoxylated quaternary ammonium salts possessing the formula $[RN(CH_3)(CH_2CH_2O)_yH(CH_2CH_2O)_xH]Cl$ wherein R is an alkyl chain derived from oleic, stearic or coco fatty acids and wherein $x$ and $y$ are 2 to 50 moles of ethylene oxide combined with each mole of fatty acid, the alkenyl-dimethylethyl-ammonium bromides $[RN(CH_3)_2C_2H_5]Br$, the alkylbenzyldimethylammonium chloride $$[R(C_6H_5CH_2)N(CH_3)_2]Cl$$

wherein R is $C_8H_{17}$ to $C_{18}H_{37}$ and the like.

In addition emulsifiers and/or surfactants may be used in conjunction with or in lieu of the quaternary ammonium salts. Typical emulsifiers contemplated include both ionic and nonionic types such as sodium stearate, morpholine oleate, sodium 2-ethylhexyl sulfate, polyglycol fatty acid esters, lecithin, cholesterol, lanolin, and the like. Examples of commercially available surfactants are di(2-ethylhexyl)ester of sodium sulfo-succinic acid, sodium cetylsulfate, diethylene glycol monostearate, sorbitan monoleate, tris(polyoxyethylene)sorbitan monolaurate and the like.

In the practice of this invention it is contemplated treating the alkali silico aluminate, e.g. sodium silico aluminate, with a small effective amount of at least one quaternary ammonium salt. The amount of quaternary ammonium salt typically ranges from about 0.1 to 10 percent by weight, based on the dry weight of the polyamide-based particles to be treated. A good working range is about 0.5 to 5.0 with a preferred range of about 1 to 3 percent by weight.

The alkali silico aluminate may be treated with the quaternary ammonium salt by any convenient wet or dry procedure including dry blending or aqueously slurrying the aluminate in the presence of the salt. Likewise, the alkali silico aluminate may be treated simultaneously with the treatment of the polyamide resin based particles, e.g. by aqueously slurrying the particles in the presence of both the aluminate and the salt.

Polyamide resin based particles treated with quaternary ammonium salt treated alkali silico aluminate have a dry resistivity in the lower part of the previously noted range of $10^{11}$ to $10^5$ ohms-centimeter, usually less than about $10^8$.

The hereinafter Examples II and III illustrate two of the best modes contemplated by the inventor in the practice of this invention.

EXAMPLE I

Polyamide-based powder particles were prepared by intimately mixing 50 grams of rutile $TiO_2$, 25 grams of Scope 30, 24.5 grams of Versalon 1112, and 0.5 gram of paraffin wax, and hot milling the mixture on a three roller mill at about 300° F. The sample was then cooled and pulverized to a fine powder (minus 200 mesh).

The resistivity of the sample was determined to be about $10^{12}$ ohm-centimeter using a Keithly Electrometer technique. The activity of the sample was tested using a parallel plate test and found to be zero; that is, the sample particles were completely inactive.

In the Keithly Electrometer technique the powder to be measured is poured into a cylindrical container of electrical insulating material to form an unpacked cylindrical body of known cross-sectional area and axial length. The unpacked powder is then compressed by reducing its axial length by a known amount and the electrical resistance of the packed cylindrical powder body is then measured by applying an electrical potential across its axial length. These measurements were made by means of a Keithly Electrometer Model 610A.

The parallel plate test consists essentially of two parallel conductive surfaces generally separated by about a one-fourth inch air gap. A potential is applied across the plates forming an electrical field. When a powder is placed in this field, the powder is attracted to the plate possessing the opposite polarity. At this latter plate the charge of the particle is reversed and the particle then moves toward the original plate. This parallel plate test indicates activity in an electrical field.

EXAMPLE II

A thirty (30) gram sample of the powder prepared in Example I was treated by ball milling for 30 minutes with 5 percent by weight sodium silico aluminate (Zeolex 7), based on the dry weight of the sample. The treated sample had a resistivity of $2 \times 10^{10}$ ohm-centimeter and showed substantially increased parallel plate activity relative to Example I.

EXAMPLE III

A thirty (30) gram sample of the powder prepared in Example I was treated by ball milling for 30 minutes with 5 percent by weight sodium silico aluminate (Zeolex 7) and 3 percent by weight of a quaternary ammonium salt (Ethoquad C/25), based on the total weight of the dry sample.

Ethoquad is a registered trademark for a series of polyethoxylated quaternary ammonium salts available from Armour Industrial Chemical Company, Division of Armour and Company, Chicago, Ill. The properties of the Ethoquad series of quaternary ammonium salts are given in Technical Bulletin No. F-4, published by Armour.

Ethoquad quaternary ammonium salts have the general chemical structure

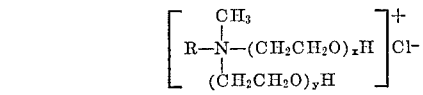

wherein R represents an alkyl chain derived from oleic, stearic, or coco fatty acids and wherein $x$ and $y$ indicate the polyoxyethylene content.

The alkyl chain R for Ethoquad C/25 (used herein) is coco. Ethoquad C/25 has an approximate molecular weight of 925 (15 moles of combined ethylene oxide). It is a liquid at 25° C. and has a specific gravity of 1.071, a pour temperature of 5° F., a flash temperature of 315° F., a fire temperature of 360° F., a pH of 7 to 9, and is soluble in water, acetone, or ethanol.

The sample treated with the Zeolex 7 and Ethoquad C/25 in accordance with this invention was tested and found to have a resistivity of $6 \times 10^6$ ohm-centimeter with a very high activity between the parallel plates (relative to Example II).

Although reference has been made herein to certain specific embodiments and details, it will be apparent to those skilled in the art that obvious modifications can be made within the scope and spirit of this invention.

I claim:

1. A process for treating solid polyamide-based resin particles for use in electrophotography which comprises intimately contacting the particles with at least one alkali silico aluminate in an amount sufficient to provide a resulting resistivity for the treated particles of about $10^{11}$ to $10^5$ ohms-centimeter.

2. The process of claim 1 wherein the alkali silico aluminate is sodium silico aluminate.

3. A process for treating solid polyamide-based resin particles for use in electrophotography which comprises intimately contacting the particles with 0.1 to 10 percent by weight alkali silico aluminate, based on the weight of the dry particles.

4. The process of claim 3 wherein the particles have a mean diameter of about 2 to 20 microns.

5. In a process for preparing solid polyamide-based resin particles for the decoration of a surface, the improvement wherein the particles are treated with about 0.1 to 10 percent by weight of at least one alkali silico aluminate and about 0.1 to 10 percent by weight of at least one quaternary ammonium salt, based on the weight of the dry particles.

6. The process of claim 5 wherein the particles are treated with sodium silico aluminate and a polyethoxylated quaternary ammonium salt.

7. A process of preparing solid, low resistivity particles for electrostatic decorating which comprises intimately contacting and treating solid polyamide-based resin particles with about 0.5 to 5 percent by weight sodium silico aluminate and about 0.5 to 5 percent by weight of a polyethoxylated quaternary ammonium salt, based on the dry weight of the particles, and recovering treated particles having a resistivity of less than about $10^8$ ohms-centimeter.

8. The process of claim 7 wherein the particles are milled in the presence of the aluminate and the ammonium salt.

9. The process of claim 7 wherein the particles are aqueously slurried in the presence of the aluminate and the ammonium salt.

10. As a composition of matter, a powdered organic decorating ink having a resistivity of about $10^{11}$ to $10^5$ ohms-centimeter and consisting essentially of a thermoplastic polyamide resin, a pigment, hydrated alkali silico aluminate, and a quaternary ammonium salt.

References Cited

UNITED STATES PATENTS

| | | | |
|---|---|---|---|
| 2,559,398 | 7/1951 | Capell | 106—19X |
| 2,622,987 | 12/1952 | Ratcliffe | 106—20 |
| 2,899,335 | 8/1959 | Straughan | 252—62.1X |
| 3,234,017 | 2/1966 | Heyl et al. | 252—62.1 |
| 3,313,730 | 3/1967 | Caruso | 106—20X |
| 3,301,698 | 1/1967 | Fauser et al. | 252—62.1X |
| 3,330,791 | 7/1967 | Mater et al. | 117—36.1X |
| 3,155,531 | 11/1964 | Fauser et al. | 252—62.1X |
| 3,112,216 | 11/1963 | Spiller | 260—18X |

JULIUS FROME, Primary Examiner

J. B. EVANS, Assistant Examiner

U.S. Cl. X.R.

106—308; 252—62.1; 260—37